(12) United States Patent
Pinault

(10) Patent No.: US 7,463,603 B2
(45) Date of Patent: Dec. 9, 2008

(54) WIRELESS COMMUNICATIONS NETWORK WITH ALLOCATION MANAGEMENT OF A SECTION OF BANDWIDTH RESERVED FOR THE TRANSMISSION OF PRIORITY REQUESTS TO ESTABLISH A LINK

(75) Inventor: Francis Pinault, Bois-Colombes (FR)

(73) Assignee: Alcatel, Paris (FR)

( * ) Notice: Subject to any disclaimer, the term of this patent is extended or adjusted under 35 U.S.C. 154(b) by 416 days.

(21) Appl. No.: 10/964,615

(22) Filed: Oct. 15, 2004

(65) Prior Publication Data
US 2005/0083843 A1 Apr. 21, 2005

(30) Foreign Application Priority Data
Oct. 17, 2003 (EP) .................................. 03292584

(51) Int. Cl.
*H04Q 7/00* (2006.01)
*H04B 7/212* (2006.01)
(52) U.S. Cl. ........................ 370/329; 370/348; 370/908
(58) Field of Classification Search ......... 370/347–349, 370/328, 329, 908
See application file for complete search history.

(56) References Cited

U.S. PATENT DOCUMENTS 5,638,371 A * 6/1997 Raychaudhuri et al. .. 370/310.2

2003/0186724 A1 * 10/2003 Tsutsumi et al. ............ 455/561
2004/0236856 A1 * 11/2004 Keohane et al. ............. 709/229

FOREIGN PATENT DOCUMENTS

EP          1 349 321 A      10/2003
WO       WO 02/07388 A2      1/2002

* cited by examiner

*Primary Examiner*—Quochien B Vuong
(74) *Attorney, Agent, or Firm*—Sughrue Mion, PLLC

(57) ABSTRACT

A wireless communications network (WLAN) comprises i) an access point (AP) coupled to a call server (ER) connected to at least one remote communications network (PTN, PDN), ii) means of reservation (MR) responsible for reserving a section of the communication bandwidth of the wireless network (WLAN) for the transmission of requests to establish a link with one of the remote networks, meeting at least one of the priority criteria selected, iii) processing means (PM) responsible for determining if a request to establish a link meets each priority criterion selected, and if so to associate to said request an authorization to use the reserved section, and iv) management means (MM) responsible, when they receive a request associated to an authorization of use, for determining the necessary resources to establish the required link, and if said necessary resources are still available within the network, in order to, if so, allocate the determined necessary resources to the establishment of the required link.

20 Claims, 1 Drawing Sheet

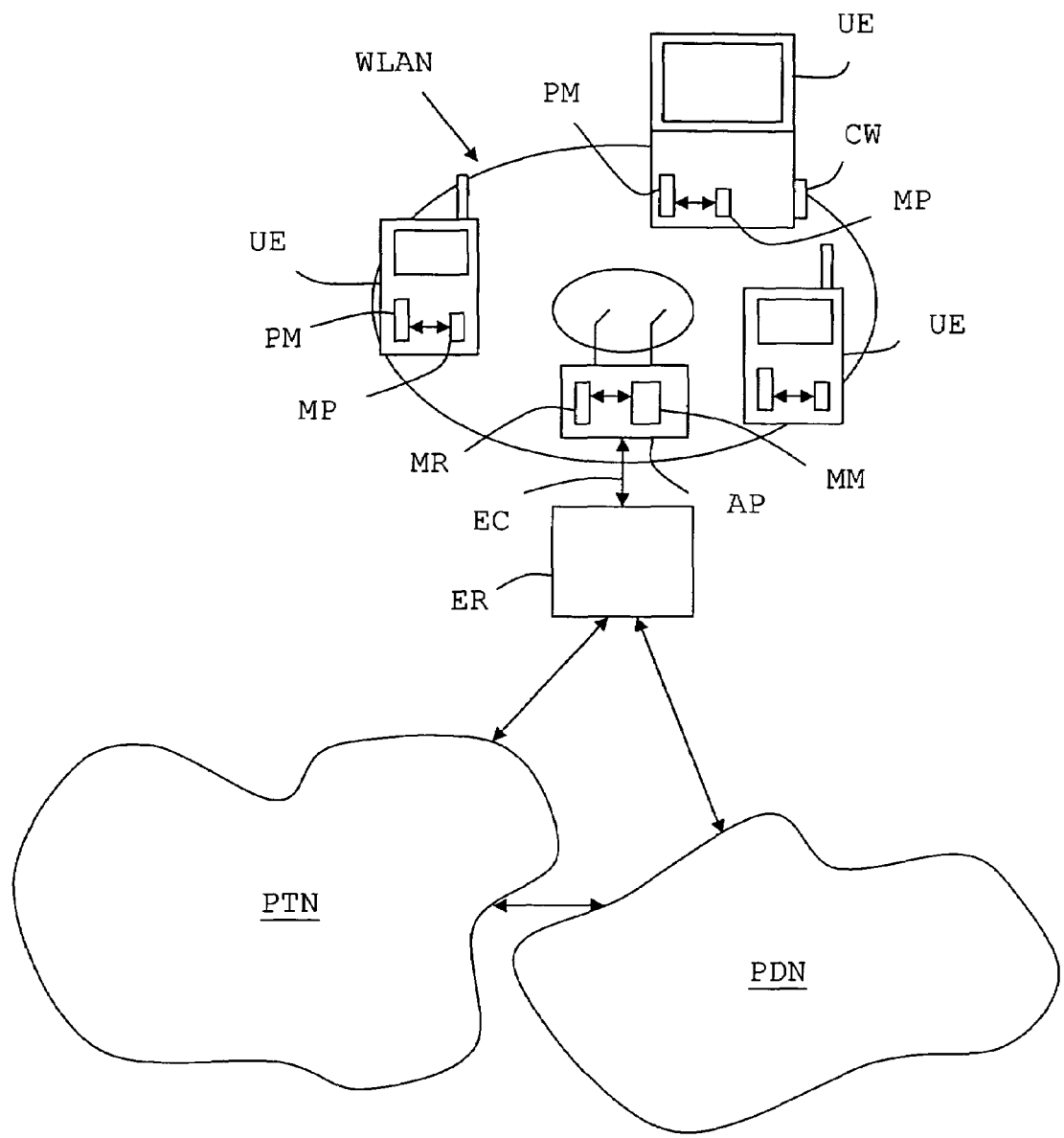
Unique figure

WIRELESS COMMUNICATIONS NETWORK WITH ALLOCATION MANAGEMENT OF A SECTION OF BANDWIDTH RESERVED FOR THE TRANSMISSION OF PRIORITY REQUESTS TO ESTABLISH A LINK

BACKGROUND OF THE INVENTION

The invention relates to the field of wireless communications networks, and more particularly to the management, within such networks, of the allocation of bandwidth for the transmission of requests to establish communication.

As the person skilled in the art knows, certain wireless communications networks comprise an access point coupled to a call server connected to at least one other communications network. This indeed enables wireless communication terminals, which are suitable for that purpose and which are connected to their access points, for establishing links with the remote networks.

More precisely, when a wireless communication terminal wishes to establish a link with a remote network, via a conventional wireless network, firstly it must transmit to the call server a request to establish a link so that the bandwidth necessary for the establishment of an uplink is allocated to it. Now, often there is not enough available bandwidth for the transmission of a request to establish a link. Consequently, in a conventional wireless network, as long as the bandwidth remains saturated, no request to establish a link can be transmitted, even if the link assumes a priority status due to the fact that it is linked, for example, to a security service or to a government service.

Admittedly, cellular networks specifically reserved for priority calls exist, as for example, TETRA and TETRAPOL networks, but the latter are particularly expensive and require specific communication terminals, and not conventional communication terminals such as mobile phones of the GSM, GSM/GPRS or UMTS type. In addition, the radio coverage offered by said dedicated networks does not permit the establishment of links in buildings.

SUMMARY OF THE INVENTION

The purpose of the invention is thus to improve the situation, so as to facilitate the transmission of priority status requests to establish a link, as frequently as possible.

To this effect, it proposes a wireless communications network comprising at least one access point coupled to a call server connected to at least one remote communications network, as for example, a public telephony network and/or a public data network with internet protocol (IP).

Said wireless communications network is characterized by the fact that it comprises:
  means of reservation responsible for reserving a section of the communication bandwidth of the wireless network at least for the transmission of requests to establish a link meeting one or more criteria selected,
  processing means responsible for determining if a request to establish a link with the remote network meets each priority criterion selected and if so associating to said request an authorization to use the section of the reserved bandwidth, and
  management means responsible, when they receive a request associated to an authorization to use, for determining the necessary resources to establish the required link, and if said necessary resources are still available within the network, in order to, if so, allocate the determined necessary resources to the establishment of the link.

As per another characteristic of the invention, when the available resources within the network are lower than the resources necessary to establish a link, the management means are responsible for performing a reallocation request at the call server to establish the required link, resources which are used by a current link presenting a lower priority.

The priority criterion pertains, for example, to the origin of the request or to the type of link required. When the priority criterion pertains to the origin of the request, the latter may consist of, for example, the network address of the wireless communication terminal which issued the request and/or the type of wireless communication terminal which issued the request and/or the type of service concerned by the required link and/or the type of application concerned by the required link and/or the identifier of the user who requires the link and/or the authentication code of the user requiring the link.

Furthermore, the network may include memory means storing the lists of priority parameters. In this case, the processing means are designed for accessing the memory means so as to compare their lists of priority parameters associated to the request, then for determining if said request meets each priority criterion selected.

Preferentially, the processing means are implemented in the wireless communication terminals which generate and transmit the requests to a network access point. In this case, the memory means are advantageously created in the form of memories which are implemented in the wireless communication terminals.

It is equally preferable that the management means and/or the means of reservation are implemented in at least one of the network access points.

The invention is particularly well suited, although in a non-exclusive way, to wireless networks designed in the form of local area networks (or WLAN for "Wireless Local Area Network") supported, for example, by 802.11x standardized technologies, but it may also be applied to public radiocommunication networks based on GSM or UMTS standards, for example.

BRIEF DESCRIPTION OF THE DRAWINGS

Other characteristics and advantages of the invention will become apparent on examination of the description detailed hereafter, and of the appended drawing, on which the unique FIGURE schematically illustrates an example of the communications installation comprising a wireless local area network equipped with an access point as per the invention and communication terminals as per the invention. The appended drawing may not only serve to complement the invention, but may also contribute to its definition, if necessary.

DETAILED DESCRIPTION OF THE INVENTION

The purpose of the invention is to permit the transmission of priority status requests to establish uplinks in wireless communications networks.

The communications installation illustrated on the unique figure, by way of example, comprises a wireless communications network WLAN, belonging, for example, to a group of businesses, a public telephony network PTN, belonging to a telephone operator, possibly cellular, and a public data network PDN.

Here, the wireless network WLAN is a wireless local area network comprising one or more access points AP, connected to an edge router ER, itself connected to a public telephony network PTN and a public data network PDN and assuring the function of call server. The invention may, however, be applied to cellular GSM type networks for emergency calls using a dedicated number, such as the number 112 or 911, for example.

As indicated above, here the wireless network is of the WLAN type, but, in variants it may be of the Bluetooth or UWB (for "Ultra Wide Band") type. Furthermore, the public telephony network PTN is, for example, of the switched type (or PSTN for "Public Switched Telephony Network"), but it may concern a PLMN (for "Public Land Mobile Network") type public network, as for example, GSM, GSM/GPRS and UMTS networks. In addition, the public data network PDN is, for example, an Internet protocol (IP) network.

Of course, the invention is not limited only to said types of networks, nor to the number of networks selected. One or more local area networks may thus coexist with one or more public or private telephony networks PTN and/or with one or more public or private data networks PDN.

The edge router ER preferentially assures the function of call server, that is it is responsible for establishing the link between wireless communication terminals UE, which are located in the coverage area of the WLAN network and whereby are likely to being connected by wave channel to said access points AP, and the public telephony PTN and data PDN networks. In the following, the edge router ER will be compared with its call server. In the variant, the access server may be implemented in one of the access points AP of the WLAN network, which may be the case if the access point AP contained additionally one ADSL access, for example.

In the example illustrated, the access point AP is connected to the edge router ER by a cable EC, preferably of the Ethernet type. However, in the variant the connection may be carried out by wave channel, for example, by a radio link of the 802.11b type.

Here, "wireless communication UE terminal" (hereafter UE terminal) means any communication device equipped with a removable or integrated WLAN card CW capable, here, of accessing PTN and/or PDN networks via the WLAN network when it is located in the coverage area of said WLAN network. Consequently, a UE terminal is, for example, a mobile phone, a portable (or laptop) microcomputer or a personal digital assistant (PDA).

When a UE terminal finds itself placed in the area of coverage of the wireless local area network WLAN and wishes to establish an uplink with a remote PTN or PDN network of the installation, it must generate then transmit to the access point AP a request to establish a link. Said request is generally presented in the form of a data frame comprising in its header the MAC (for "Medium Access Control"-level 2 of the OSI model) address of the UE terminal. The access point AP then transmits to the call server ER so as to determine if the communication bandwidth of the available WLAN network is sufficient to permit the establishment of the required uplink. If so, the fraction of bandwidth necessary for the link is allocated to the requesting UE terminal, whereas, if not, the call server ER transmits to the UE terminal, via the access point AP, a message signaling the saturation of resources.

In a wireless network as per the invention we proceed in a different way. Indeed, the WLAN network firstly comprises a reservation module MR responsible for reserving a section of the communication bandwidth for the transmission of requests to establish links meeting one or more priority criteria selected. In other words, part of the bandwidth of the WLAN network is reserved exclusively for the interpretation, or for the routing in view of an interpretation, of priority status requests to establish an uplink.

Any type of priority status may be considered in order to define "privileged" (or priority) users. But, the priority status generally refers more particularly to security and government services.

Each priority criterion may thus pertain to the origin of the request or to the type of link required. For example, the origin of the request may consist of the network address (MAC) of the UE terminal which issues it and/or the type of UE terminal which has issued it and/or the type of service concerned by the required link and/or the type of application concerned by the required link and/or the identifier of the user who requires the link and/or the authentication code of the user requiring the link. The type of link required may be, for example, defined by a dedicated call number used to generate the request, such as the number 911 or 112, or for example, by a dedicated URL address of the "www.police.org" type in the case of access to the service via the Internet.

The size of the section of reserved bandwidth may be selected according to the requirements. However, so as not to disturb non-priority users of the WLAN network, it is preferable that it represents a few percentages, typically 5%, of its communication bandwidth.

The reservation module MR is preferentially implemented in each access point AP of the WLAN network, but it could also be implemented only in certain access points AP of a network assuring a coverage including other more modest sized cells. Said type of access points permit the establishment of cells named "Umbrella".

The WLAN network as per the invention comprises processing means responsible for determining if a request to establish a link with one of the remote PTN and PDN networks of the installation meets each priority criterion selected. Preferentially, the processing means are designed in the form of processing modules PM implemented in the UE terminals which may be connected to the WLAN network.

Thus, when a user signals to his UE terminal that he wants to establish a selected link, it communicates to him the dedicated call number or the identifier of the terminal that he wishes to reach, as for example, his telephone number or his internet address and possibly the type of service required and/or the type of application required and/or his user identifier and/or his authentication code. In fact, any information (or any parameter) able to define a priority may be communicated. Of course, the UE terminal may store some of the priority information in its memory so that the user does not need to provide it.

Once the processing module PM has the priority information (or parameters), it determines if the user is authorized to establish the priority link required.

To do so, it is advantageous to arrange memory means storing one or more lists of priority parameters (or information). Said memory means are, for example, created in the form of parameter memories implemented in the UE terminals of a processing module PM.

Thus, each processing module PM may access the associated memory MP in order to compare the list(s) of priority parameters that it stores with the priority parameter(s) associated to the request and to determine if said request meets each priority criterion selected.

If the request does not meet the priority criterion (criteria), the processing module PM does not associate the authorization to it and the transmission procedure of the request to establish a link proceeds in a conventional way, as previously indicated, that is, without priority or with a level of priority lower to that offered by the service subject of the invention.

If the request meets the priority criterion (criteria), the processing module PM associates to it an authorization to use the reserved section of bandwidth, then the UE terminal transmits its request and the authorization associated to the access point AP.

In order to manage the authorization to use the reserved section associated to the requests, the WLAN network as per the invention comprises a management module MM. The latter is more precisely responsible, when it receives a request associated to an authorization of use, for determining the necessary resources (and in particular the bandwidth) to establish a link subject of the request.

The management module MM is preferentially implemented in the access point AP, but it may also be implemented in a device named "Wireless Switch" capable of managing the links between various access points and the functions, for example, of the "handover" type. Such a Wireless Switch may also manage LAN type links. Whatever the area of implementation of the management module MM, it is connected to the call server ER in order to carry out allocation requests for the necessary resources to establish the uplinks between its WLAN network and the remote PTN and PDN networks.

If the necessary resources to establish the required link are still available, the management module MM authorizes the establishment of the link and allocates to it the necessary amount of resources which it has just determined, then the request is transmitted to the call server ER.

If the necessary resources to establish the required link are unavailable, the management module MM transmits to the call server ER a request to reallocate the resources used by a current link, in favor of the priority status link required. More precisely, the management module MM asks the call server ER if it is possible to interrupt at least one of the established links, associated to priorities lower than those of the required link.

The management module MM preferentially has lists of priority parameters, serving as comparisons, and levels of associated priorities.

If the call server ER authorizes interruption of the link, the management module MM allocates to the establishment of the request resources corresponding to those necessary, which it has previously determined, then the request is transmitted to the call server ER. Conversely, the management module MM transmits a message signaling the saturation of resources to the UE terminal, via the access point AP.

The processing modules PM, management module MM, reservation module MR, and possibly the parameter memories MP, may be created in the form of electronic circuits, software (or computer) modules, or a combination of circuits and software.

The invention is not limited to embodiments of wireless communication networks, wireless communication terminals and network access point as described hereabove, only by way of example, but it may include all of the variants that the person skilled in the art may consider within the scope of the claims hereafter.

Thus, as aforementioned, an application of the WLAN type wireless local area network invention has been described. However, the invention may also be applied to cellular networks of the GSM type in the case of the use of emergency call numbers, as for example, the number 112 or 911.

Furthermore, the invention also relates to the reservation of means necessary for the vocal establishment of the priority status call management service, that is by calling the service in voice recognition mode. The means permitting the establishment of the voice recognition service are therefore implemented in a server attached to the call server. Such means may be used for the processing, for example, of XML or VXML type protocols characteristic of the invention. In this case, the establishment of a service characteristic of the invention requires more than the simple reservation of bandwidth enabling, in a WLAN network, a priority access request to be routed and interpreted. It requires, in effect, the possibility of establishing at any moment a speech channel towards the voice recognition server prior to deciding on the priority status of the request to establish a link.

The invention claimed is:

1. A wireless communications network comprising at least one access point coupled to a call server that is connected to at least one remote communications network, said wireless communications network comprising:
    means for reserving a section of a communication bandwidth of said wireless network at least for the transmission of requests to establish a link with said remote network meeting at least one selected priority criterion, wherein said reserving occurs prior to said transmission of said requests,
    processing means for determining if a request to establish a link meets each said selected priority criterion, and if so, associating to said request an authorization to use said reserved section, and
    management means, on receipt of said request, for determining necessary resources to establish the link and if said necessary resources are available within said network, and if so, allocating the determined necessary resources to the establishment of said required link.

2. A network as set forth in claim 1, wherein said management means is designed, when said necessary resources to establish the required link are not available, for carrying out at said call server a request for reallocation of resources used for a current link presenting a priority lower than said request, so as to establish said required link.

3. A network as set forth in claim 1, wherein said priority criterion is selected in a group comprising at least one origin of request and one type of link.

4. A network as set forth in claim 3, wherein said origin of request comprises the network address of the wireless communication terminal having issued the request and/or the type of wireless communication terminal having issued the request and/or the type of service concerned by the required link and/or the identifier of the user requiring the link and/or the authentication code of the user requiring the link.

5. A network as set forth in claim 1, further comprising memory means for storing the lists of priority parameters, wherein said processing means is configured to access said memory means so as to compare the lists of stored priority parameters with the parameters associated to said request, and to determine if said request meets each priority criterion selected.

6. A network as set forth in claim 1, wherein said processing means is implemented in the wireless communication terminals configured to generate and transmit said requests to an access point in the network.

7. A network as set forth in claim 5, wherein said memory means comprises memories implemented in said wireless communication terminals (UE).

8. A network as set forth in claim 1, wherein at least one of said management means and said means of reservation (MR) is implemented in an access point in said network.

9. A network as set forth in claim 1, wherein said network constitutes a wireless local area network.

10. Wireless communication terminal for a wireless communications network as claimed in claim 1, comprising:

processing means for determining if a request to establish a link meets each priority criterion selected, and memory means for storing lists of priority parameters.

11. The network of claim 1, where said reserved section of said communication bandwidth is reserved exclusively for interpretation of priority status requests to establish an uplink to said network, or routing in view of said interpretation.

12. An access point to a wireless communications network, comprising:

means for reserving a section of communication bandwidth of the wireless network at least for transmission of requests to establish a link with a remote network, meeting at least one selected priority criterion, wherein said reserving occurs prior to said transmission of said requests, and management means (MM), on receipt of a request associated to an authorization of use, for determining the necessary resources to establish the required link, and if said necessary resources are available within said network, and if so, allocating the determined necessary resources to the establishment of said required link.

13. The access point of claim 12, where said reserved section of said communication bandwidth is reserved exclusively for interpretation of priority status requests to establish an uplink to said network, or routing in view of said interpretation.

14. A method of wireless communication in a network having at least one access point coupled to a call server coupled to at least one remote communications network, said method comprising:

reserving a section of a communication bandwidth of said wireless network at least for the transmission of requests to establish a link with said remote network meeting at least one selected priority criterion, wherein said reserving occurs prior to said transmission of said requests, determining if a request to establish a link meets each said selected priority criterion, and if so, associating to said request an authorization to use said reserved section, and on receipt of said request, determining necessary resources to establish the link and if said necessary resources are available within said network, and if so, allocating the determined necessary resources to the establishment of said required link.

15. The method of claim 14, wherein said reserving comprises, when said necessary resources to establish the required link are not available, carrying out at said call server a request for reallocation of resources used for a current link presenting a priority lower than said request, so as to establish said required link.

16. The method of claim 14, further comprising selecting said priority criterion from a group comprising at least one origin of request and one type of link.

17. The method of claim 16, wherein said origin of request comprises the network address of the wireless communication terminal having issued the request and/or the type of wireless communication terminal having issued the request and/or the type of service concerned by the required link and/or the identifier of the user requiring the link and/or the authentication code of the user requiring the link.

18. The method of claim 14, wherein said determining is implemented in the wireless communication terminals configured to generate and transmit said requests to an access point in the network.

19. The method of claim 14, wherein at least one of said determining and said reserving is performed in an access point in said network.

20. The method of claim 14, where said reserved section of said communication bandwidth is reserved exclusively for interpretation of priority status requests to establish an uplink to said network, or routing in view of said interpretation.

* * * * *